(12) United States Patent
Kovach et al.

(10) Patent No.: US 12,737,254 B2
(45) Date of Patent: Sep. 15, 2026

(54) EMBEDDED SYSTEM INTEGRITY MONITORING ENFORCEMENT ARCHITECTURE

(71) Applicant: Government of the United States as represented by the Secretary of the Air Force, Wright-Patterson AFB, OH (US)

(72) Inventors: Nicholas Kovach, Springfield, OH (US); Alexander Paxton, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/798,920

(22) Filed: Aug. 9, 2024

(65) Prior Publication Data

US 2026/0044406 A1 Feb. 12, 2026

(51) Int. Cl.
*G06F 11/00* (2006.01)
*G06F 11/07* (2006.01)
*G06F 11/34* (2006.01)

(52) U.S. Cl.
CPC ...... *G06F 11/0793* (2013.01); *G06F 11/0781* (2013.01); *G06F 11/3428* (2013.01)

(58) Field of Classification Search
CPC ............ G06F 11/0793; G06F 11/0781; G06F 11/3428
USPC ........................................................ 714/1–57
See application file for complete search history.

(56) References Cited

U.S. PATENT DOCUMENTS 8,949,797 B2 2/2015 Aaraj
10,498,744 B2 12/2019 Hunt
11,656,932 B2 * 5/2023 Mahamuni .......... G06F 11/3409 714/48
2003/0126517 A1 * 7/2003 Givoni ................ G06F 11/3688 714/E11.208
2005/0177693 A1 * 8/2005 Nahum ............... G06F 11/2069 714/E11.107
2005/0195748 A1 * 9/2005 Sanchez .............. H04L 41/5025 370/254
2008/0307406 A1 12/2008 John
2012/0117426 A1 * 5/2012 Takao ................. G06F 11/3672 714/E11.178

(Continued)

*Primary Examiner* — Sarai E Butler
(74) *Attorney, Agent, or Firm* — AFMCLO/JAZ; Larry L. Huston

(57) ABSTRACT

A system embedded in and for monitoring the integrity of a computer architecture. The system receives and compiles offline data into registration objects. A comprehensive database tests multiple parcels of the offline data relative to corresponding benchmarks. A reporter component determines which test results, if any, should be escalated as a warning of anomalous behavior. The reporter component directly communicates with a graphical user interface and an enforcement component. The enforcement component takes mitigative action relative to the external component(s) which are the subject of the warning(s). Preferably a prioritization component is interposed between the database and the reporter. The prioritization component prioritizes the warnings from the database for processing by the reporter component.

7 Claims, 10 Drawing Sheets

(56) References Cited

U.S. PATENT DOCUMENTS

2012/0239623 A1* 9/2012 McCann ................. G06F 16/11
707/E17.007
2013/0212565 A1 8/2013 Nishiyama
2013/0227536 A1 8/2013 Li
2014/0115565 A1 4/2014 Abraham
2014/0122942 A1* 5/2014 Vilela ................. G06F 11/0793
714/48
2014/0130020 A1 5/2014 Boshernistan
2015/0363258 A1* 12/2015 Shin .................... G06F 11/0703
714/3
2016/0048437 A1* 2/2016 Shukla .................. G06F 11/263
714/33
2016/0162392 A1* 6/2016 Hu ...................... G06F 11/3688
714/38.1
2016/0246590 A1 8/2016 Yu
2016/0378648 A1* 12/2016 Ekambaram .......... G06F 11/301
714/38.1
2018/0191747 A1 7/2018 Nachenberg
2022/0058103 A1* 2/2022 Orndorf .............. G06F 11/3495
2024/0427656 A1* 12/2024 Byron ................. G06F 11/0772
2025/0063448 A1* 2/2025 Kalia .................... H04W 36/13

* cited by examiner

EMBEDDED SYSTEM INTEGRITY MONITORING ENFORCEMENT ARCHITECTURE

STATEMENT OF GOVERNMENT INTEREST

The invention described and claimed herein may be manufactured, licensed and used by and for the Government of the United States of America for all government purposes without the payment of any royalty.

FIELD OF THE INVENTION

The present invention is related to a system for integrity monitoring and reporting of software and more particularly to such a system for use in performing integrity monitoring and identifying integrity issues in embedded systems.

BACKGROUND OF THE INVENTION

Software is ubiquitous in life. But so are breaches of systems integrity and leading to downtime, sabotage and erroneous responses of that software.

Issues of system integrity can appear through common non-malicious actions or malicious actions by threat actors. Non-malicious actions can arise from differences in design with the physical system, programming errors, faulty wiring, hardware errors, configuration mismatches, etc. Malicious actions are intentional and may affect the cybersecurity integrity of the system. Such actions include abuse of messaging protocols, processing capabilities and data representations.

Within common architectures, embedded systems may be hosted on computing hardware and commercial operating systems, with custom applications performing the specific intended functions. In other systems, the embedded systems may be hosted in custom computing hardware, using real-time operating systems with custom applications. These embedded systems are typically networked to offer seamless integration of capabilities. But this integration may not correlate with the system design, resulting in low integrity or a malicious actor specifically targeting a vulnerable part of the system for abuse of the system function(s).

More particularly, embedded systems and architectures can represent complex systems consisting of hierarchically networked components and controllers, with unique criticality, reliability, confidentiality, integrity, and availability requirements. These systems include, for example, both onboard systems for aviation platforms and off-board systems in ground stations or hosted in the cloud, all requiring a great degree of networked connectivity. In embedded systems, such as avionic platforms, data exchange is a necessary and critical part of carrying out the functions of the embedded system. Data exchange may be accomplished by adopting architectures and specific technologies to take advantage of networked data sharing.

Behavioral analysis of embedded software and ancillary software is useful to determine the integrity of the system as a whole. Such behavioral analysis feeds a test capability to determine whether or not predefined test points of the system have been automatically accomplished.

Due to the hierarchical nature of these networked embedded computing systems, the integrity issues must be holistically viewed as a collection. This collection requires monitoring individual systems and/or components and the reasoning of the state of integrity of that system and/or components.

But monitoring attempts in the prior art rely upon a linear communication orbit using event information from a local database. Particularly, the prior art attempts monitor the respective system for changes in the database. These attempts are insufficient due to requiring a running system and may not protect against corruption by common and ubiquitous data exchanges and messaging.

As such, there is a need for a comprehensive system and method that incorporates published data, real-time data collected from the running system, and emerging data from advanced algorithms in order to evaluate the integrity of the embedded system and the related architecture. The system and method of the present invention advantageously do not police changes in the network. The system and method of the present invention are passive and do not require the other compute nodes, such as sensors, to participate or coordinate in real-time. The system advantageously observes communication patterns, communication data/messages without having to monitor the network, providing intervention much closer to real time than the prior art attempts.

SUMMARY OF THE INVENTION

In one embodiment the invention comprises a system for monitoring the integrity of a computer architecture and being embeddable therein. The system comprises a registration component for receiving and compiling offline data into registration objects, a behavior, constraint and test data database for receiving the offline data from the registration component and measuring the offline data against predetermined benchmarks to yield test results, a reporter component for determining which test results, if any, should be escalated as a warning of anomalous behavior and an enforcement component for taking mitigative action with external components responsive to anomalous behavior reported in the test results.

In one embodiment the invention comprises a system for monitoring the integrity of a computer architecture and being embeddable therein. The system comprises a registration component for receiving and compiling offline data into registration objects, a behavior, constraint and test data database for receiving the registration objects from the registration component and measuring the offline data against predetermined benchmarks to yield test results, a prioritization component configured to receive plural inputs from the behavior, constraint and test data database in parallel and prioritize an order for processing the test results, a reporter component for determining which test results, if any, should be escalated as a warning of anomalous behavior and an enforcement component for taking mitigative action with external components responsive to anomalous behavior reported in the test results.

In one embodiment the invention comprises a method of monitoring the integrity of a computer architecture using a system embedded therein. The method comprises the steps of providing a plurality of benchmarks relevant to operation of the computer, receiving offline data comprising multiple packets of data, compiling the offline data into registration objects using a registration component, measuring the offline data against the respective benchmarks to using a behavior, constraint and test data database to yield test results, determining which test results should be escalate as a warning of anomalous behavior and taking mitigative action with one or more external components responsive to the respective warnings of anomalous behavior.

DETAILED DESCRIPTION OF THE INVENTION

Figure 1:
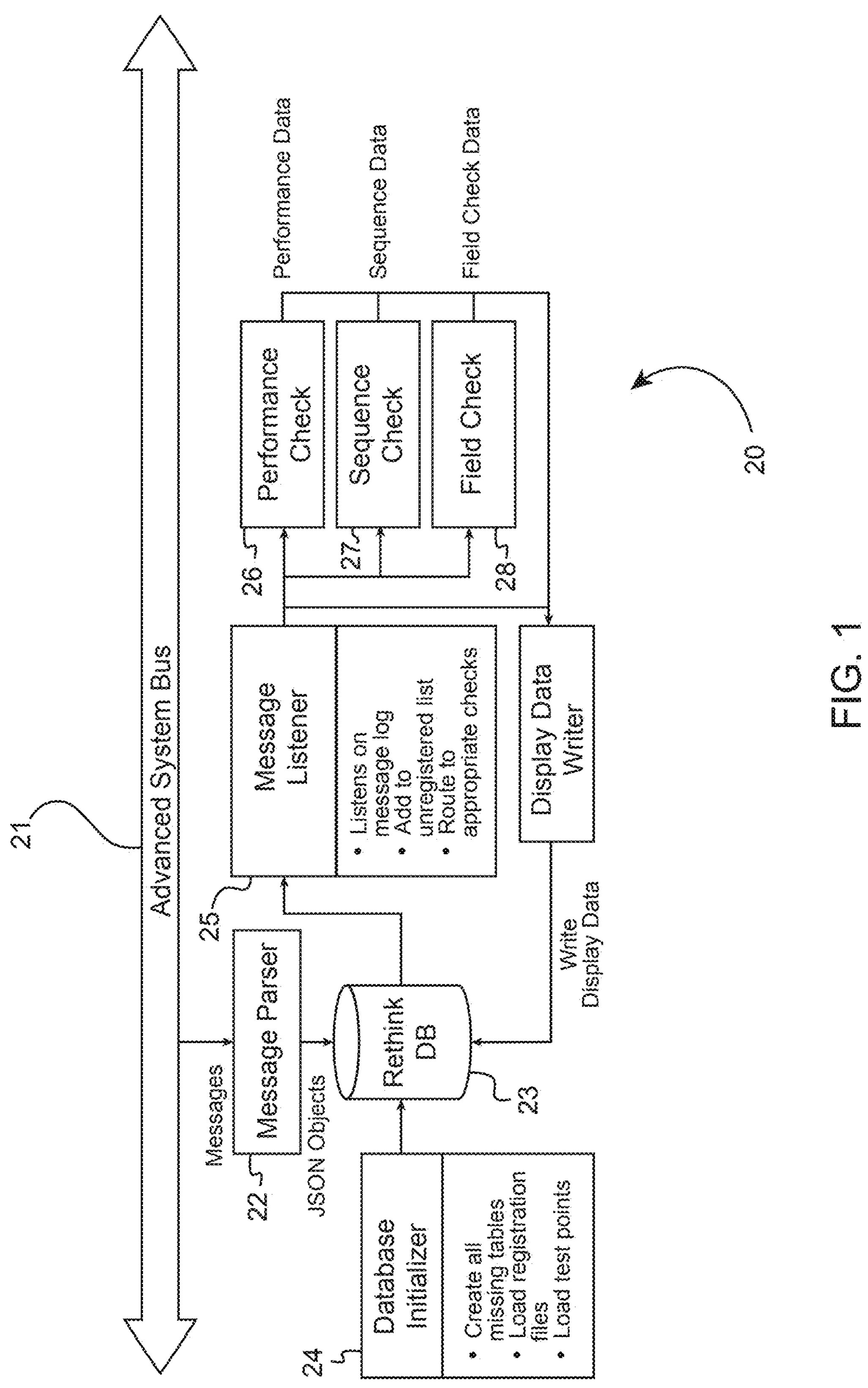
FIG. 1 is a block diagram of a system architecture according to the prior art.

Referring to FIG. 1, an Advanced Microcontroller Bus Architecture (AMBA) 20 is an open-standard, on-chip interconnect specification for the connection and management of functional blocks in system-on-a-chip (SoC) designs. Since the 1990's, AMBA 20 buses have included an Advanced System Bus (ASB) 21, an Advanced Peripheral Bus (APB), etc. An important aspect of an SoC is not only which components or blocks it houses, but also how they interconnect. The ASB is a solution for the blocks to interface with each other within established protocols. A data bus (DB) is a particular ASB, which may include a combination of a common data model, a common command set, and a messaging infrastructure to allow different systems to communicate through a shared set of interfaces.

The AMBA 20 may also include a message parser 22. A message parser 22 is a program that interprets the physical bit stream of an incoming message, and creates an internal logical representation of the message in a tree structure. The message parser 22 also regenerates a bit stream for an outgoing message from the internal message tree representation. The message parser 22 feeds data to a distributed database 23, such as a SQL or NoSQL database, e.g. RethinkDB, to facilitate pushing real-time updates for query results to applications. The distributed database 23 also receives input form a database initializer 24. Output from the distributed database 23 is received by a message listener 25. The message listener 25 receives asynchronously delivered messages and defines actions to be taken when the message arrives. The message listener 25, in turn, communicates with a performance check 26, a sequence check 27 and/or a field check 28.

Figure 2:
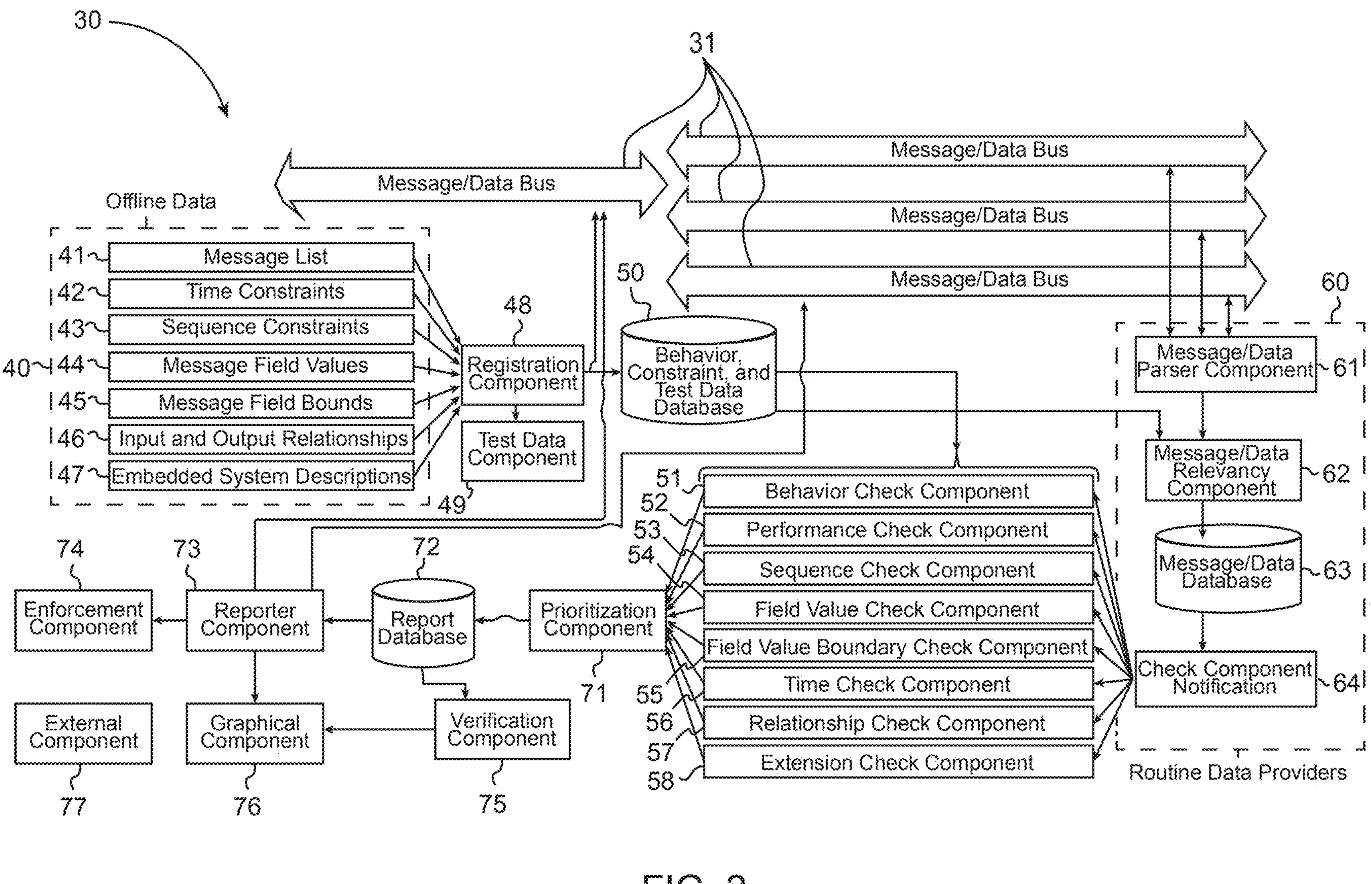
FIG. 2 is a block diagram of a system architecture according to the present invention.

Referring to FIG. 2, the embedded system integrity monitoring and enforcement architecture (ESIMEA) 30 of the present invention performs holistic integrity monitoring and enforcement of a computer system. The ESIMEA 30 detects issues adversely affecting integrity through both malicious actions of threat actors and non-malicious actions. The result is an improved cybersecurity posture of the ESIMEA 30 using the present invention.

The ESIMEA 30 begins with offline data 40 which include multiple packets of discrete and/or integrated data. The offline data 40 may be derived primarily from Interface Control Documents (ICD) and any applicable standards documents detailing the system facing interactions consisting of: Message List 41, Time Constraints 42, Sequence Constraints 43, Message Field Values 44, Message Field Value Bounds 45, Input and Output Relationships 46, and Embedded System Descriptions 47. The Message List 41, in turn, may consist of message names, message identifiers, and message version numbers. The message list 41 elements are used to later determine which messages are relevant and which message are not relevant. The Time Constraints 42, in turn, include data for periodic or aperiodic messages and the period that the message is sent if periodic and the bounds of that period (i.e. message must be sent at least five times a second, but no more than seven times a second). Time constraints 42 may be considered in terms of relationships between messages (i.e. if message X is sent, then message Y should be sent within 500 milliseconds). The Sequence constraints 43, in turn, include data relating to message ordering or relationships to other messages. The Message field values 44, in turn, include data relating to the expected values of each of the fields in the message data. These data include knowing whether or not the field is optional (i.e. can be omitted without violating the ICD), mandatory (i.e. must be present or the data are considered invalid), field data types (integer, float, double, character, etc.), a list (holds multiple values), and security classification markings (if required). The Message field value bounds 45, in turn, includes information regarding the field value bounds, which may be minimum and maximum values (i.e. integer between 10 and 9999), characters that are only visible (i.e. are displayed when printed on physical paper or to a display screen) or otherwise limited, if a field can or cannot be null (i.e. empty), whether or not the field is a list and if there is a minimum or maximum associated with what the list can hold. The Input and output relationships 46, in turn include data relating to whether certain inputs will trigger certain outputs and can be used to determine relationships with other components in the system/subsystem. The focus is on Inputs/Outputs, such discrete signals and not just messages. The Embedded system descriptions 47 include information on the systems/subsystems which are running and exchanging messages/data on the bus under observation. This information may contain a list of names, types of buses used, inputs and outputs (including discrete, data bases, special signals), IP addresses, MAC addresses, UUIDs, power/thermal requirements, and other information from the interface control document (ICD) not captured in the other data categories (such as special configuration options).

These data are combined into registration objects via a onent. The Registration component 48 is responsible to process data for efficient storage/utilization for the larger system. The Registration component 48 accomplishes this function by accepting multiple data formats (XML, JSON, binary, etc.). Formats of the registration objects can be any machine readable format. The Registration component 48 then forms a registration object. This registration object is optimized for storage and accessed by an embedded system via a central processing unit (CPU). This object can be exchanged over a network, such as a message bus or be read locally from memory on initialization/startup. The Registration component 48 is also responsible for processing the test points associated with all of the offline data 40. After registered objects have been created for a system the ESIMEA 30 has the ability to consolidate the varying components from different registered programs to create higher level Test Data.

The Test data component 49 is responsible for accepting user inputs such as which test points to monitor, labels, relationships in data, etc. The Test data component 49 categorizes the test data that are aggregated from the Registration Data. Test data are then be saved alongside the rest of the data to be used by a Test verification component 75.

Once the data are processed for efficient storage and utilization a Registration component 48 will store data into a Behavior, Constraint, and Test Data Database 50. The Registration component 48 provides for data organization within the Behavior, Constraint, and Test Data Database 50.

After the ESIMEA 30 is initialized, the next phase involves starting Runtime Data Providers which provide benchmarks. The runtime data providers 60 may be any or all of a message data parser component 61, a message/data relevancy component 62, a message/data database 63 and/or a check component notification 64. Particularly, a Message/Data Parser Component 61 may be instantiated to listen across one or more message/data buses 31. This listening may start one or more software services. For example, as messages and data arrive, typically from the message data bus 31, the Message/Data Parser Component 61 passes these data to a Message/Data Relevancy Component 62 which determines whether the test data are relevant and filters unneeded data.

If the data are determined to be relevant, the data are preferably formatted to be stored in a Message/Data Database 63 for further handling by a Check Component Notification 64. The Check Component Notification 64 listens for new information being written into the database and will make a determination which check components are relevant. The Check Component Notification 64 notifies the various checks to do the respective analyses.

Various System Checks in ESIMEA 30 operate on the data from a Behavior, Constraint, and Test Data Database 50 in order to set benchmark conditions upon which incoming messages and data will be measured against. A Behavior check component 51 analyzes the actions of the ESIMEA 30 to determine if anomalous actions are being taken which fall outside of normal operations as defined in the database. Normal operations are typically defined by the ICD. A Performance check component 52 looks at interactions in and out of the ESIMEA 30 which fall within predetermined timing characteristics (delay, latency etc.). A sequence check component 53 looks at groups of messages to determine if registered functions of programs are being appropriately executed and/or completed based on order, priority, etc. A Field value check component 54 looks at messages going across the system and checks against a registered list of how fields inside messages from registered systems are utilized. The checks determine whether fields are improperly missing or improperly present. A Field Value Check Component 55 checks message contents against the corresponding message definition to determine whether the contents fall within the bounds noted in the definition (length, values, format, etc.). A Time check component 56 analyzes timestamps of messages flowing through the system to determine if there are time mismatches across the system. Time mismatches that may cause synchronization issues (plus or minus a time period, range, etc.) may be particularly significant. A Relationship check component 57 checks for registered interactions between different systems. I.e. if certain inputs will trigger certain outputs, it can also be used to determine relationships with other components in the corresponding system/subsystem). An Extension check component 58 allows yet additional check components to be added to the system, similar to plugins or snap-ins which extend the capability of the system while using the same data. The check components will access relevant stored data in order to perform analysis and make determinations about the status of the system. These data can include the data in the Behavior, Constraint, and Test Data Database 50 and the Message/Data Database after processing by the Check Component Notification.

Once the relevant checks have been completed the check results will preferably be placed sent to an optional Prioritization component 71. The Prioritization component 71 prioritizes the order for processing the results and is in charge of writing the results to a Report database 72. The Report database 72 then sends the data to a Reporter component 73.

The Reporter component 73 reads the entries from the Report database 72 and determines which results, if any, should be escalated as a warning of anomalous behavior in the system. The Reporter component 73 sends the warning to an Enforcement component 74. Reporter component 73 is in charge of taking data from the Report database 72 and reporting these data to the Enforcer Component and to the Graphical User Interface. The Enforcement component 74 takes action against the originator as determined by the check results. The Reporter component 73 is also in charge of passing along the results to one or more graphical interfaces(s) that will display the relevant information as it is being processed and seen by the ESIMEA 30. The displays may be external to eSIME.

A Test verification component 75 monitors the Report database 72 for the results from the System Checks. The Test verification component 75 loads the previously saved test verification data to then monitor the incoming results from the Report database 72. The test verification component 75 takes reports from the Report database 72 and cross references the reports against Test Data for additional analyses on the message/data traffic. The incoming results will be checked for 1) which program the test result is tied or related to and 2) whether the underlying data in the result match the data registered as a Test Data point. If all data within a Test Data point matches an incoming result from the Report database 72 then a note of the Test Data succeeding will be reported to external graphical component(s) 76 which may be one or more graphical user interfaces.

An Enforcement component 74 is ultimately responsible for using the results to interact with external components 77. External components 77 may include tools such as network switches, policy management engines, security scanners, etc. The Enforcement component 74 is responsible for alerting these external components 77 that some mitigative action, such as throttling and up to and including cessation of activity, may be required due to a detected integrity issue. For example, with a network switch, the alert may result in network traffic being limited or even discontinued.

Figure 3:
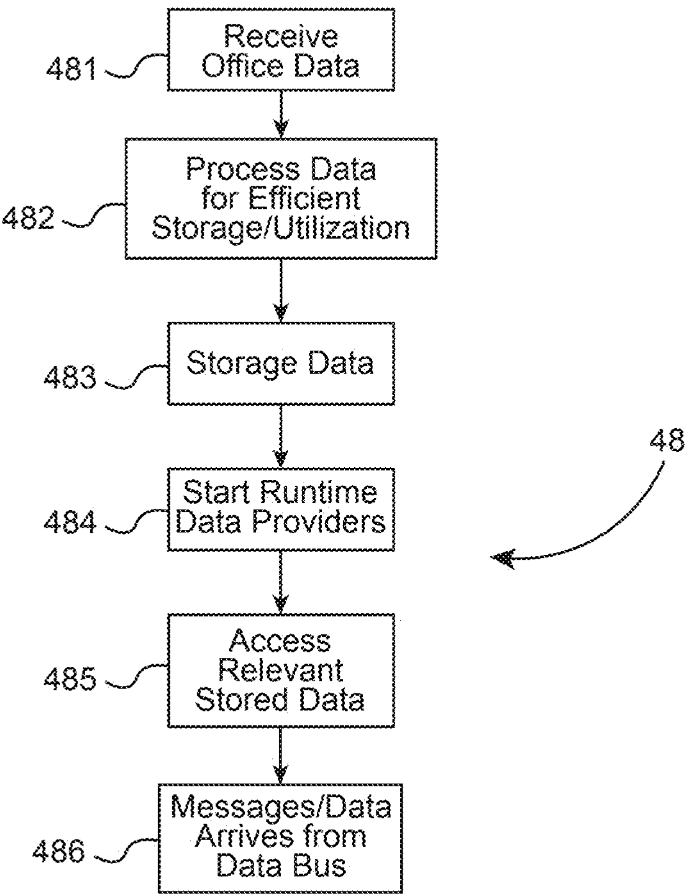
FIG. 3 is an initialization flow chart of the system according to the present invention receiving offline data.

Referring to FIG. 3, in operation, the Registration component 48 performs the following steps: receives the offline data 40; processes the data for efficient storage, utilization and retrieval; stores the data which has been processed; starts the runtime for the data providers and accesses the relevant data which has been stored. Further messages and data then arrive from the data bus.

Figure 4:
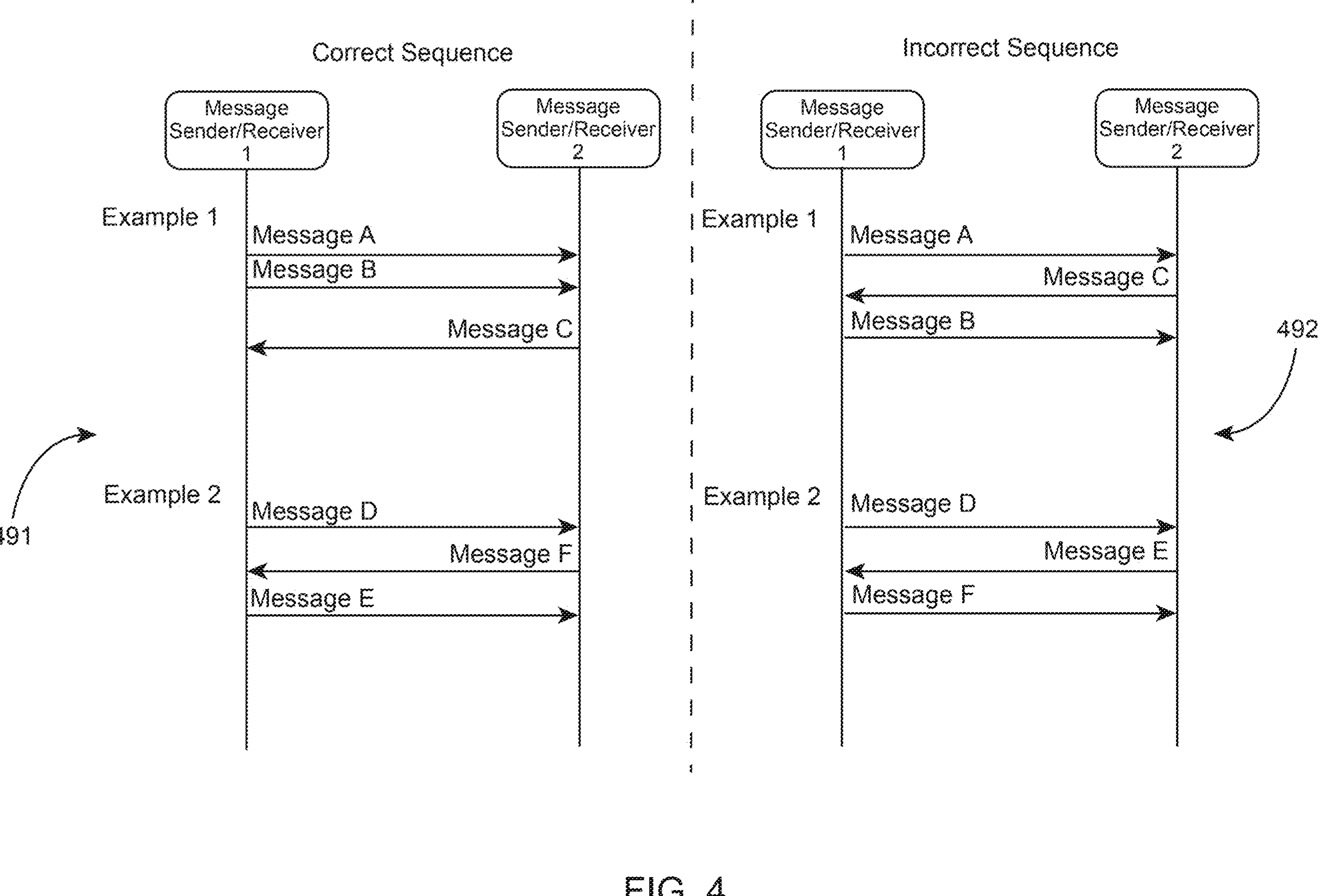
FIG. 4 is a flow chart of exemplary sequence constrains for message exchange ordering.

Referring to FIG. 4, an exemplary correct sequence 491 and incorrect sequence 492 are shown. The Sequence constraints 43 of the offline data 40 will control the determination of whether the sequence is correct or incorrect. For example, in a correct sequence 491, if message A is sent by Sender 1, then message B is expected by Receiver 2. After both of these messages transmit, then message C is expected to be sent from Sender 2 to Receiver 1. But in an incorrect sequence 492, message C is sent from Sender 2 to Receiver 1 before Sender 1 sends message B from Sender 1 to Receiver 2. A warning is sent for the noncompliance.

In a similar nonlimiting example, a correct sequence 491 shows that if message D is sent from Sender to Receiver 2, then message E should not be sent from Sender 1 to Receiver 2 until message F is received by Receiver 1. Any other message ordering would be considered invalid and should be flagged. For example, if message E is sent by Sender 2 received by Sender 1, the ordering is invalid and should be flagged.

Figure 5:
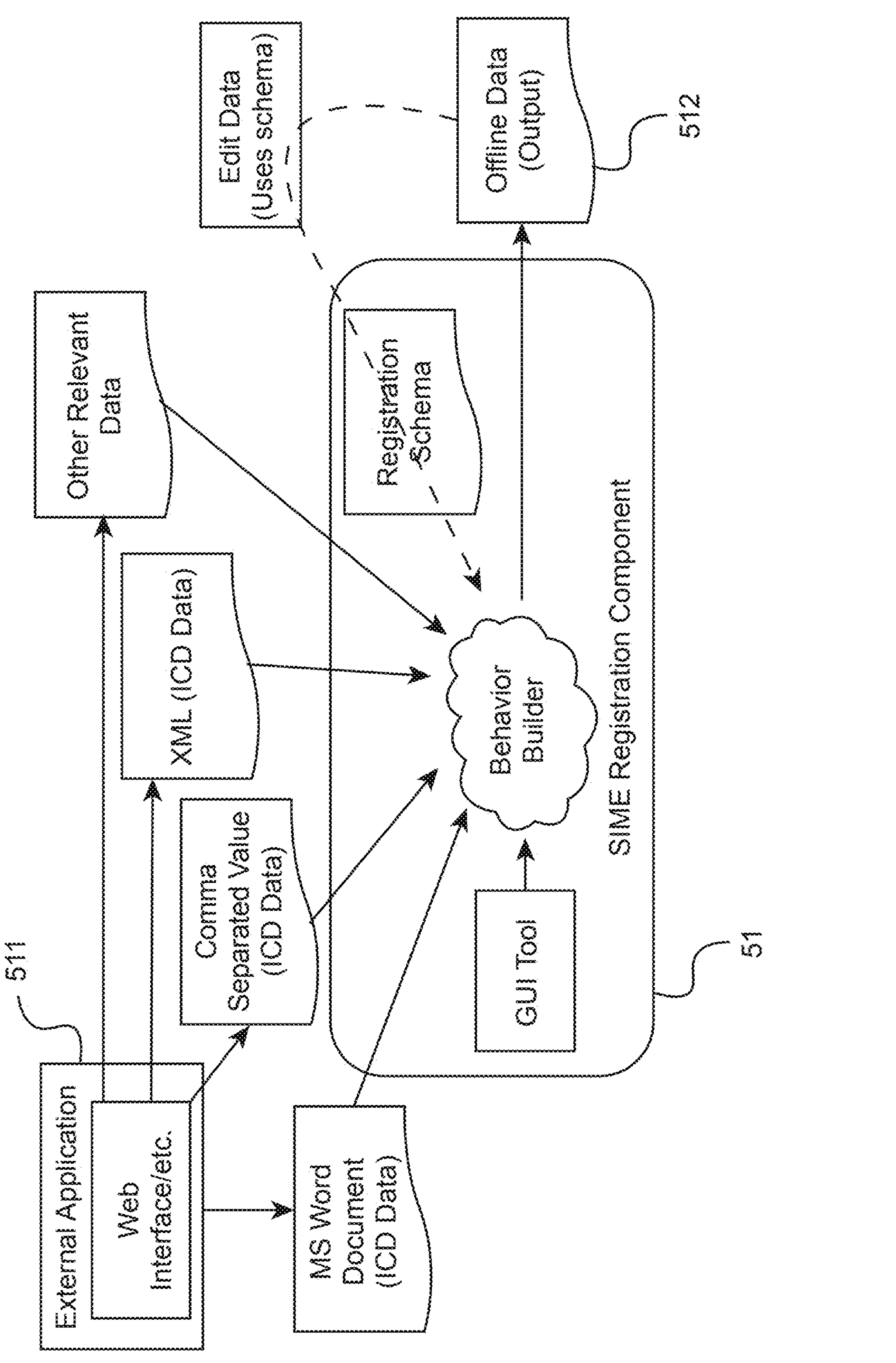
FIG. 5 is a block diagram of a registration component.

Referring to FIG. 5 and examining the Registration component 48 in more detail, the Registration component 48 functions by accepting multiple data formats (XML, JSON, binary, etc. format of the registration objects, which can be in any machine readable format. The Registration component 48 then forms the registration object which is sent to the offline data 40. The Registration component 48 receives external input, digitized machine readable input and human input to create registration data for use by the rest of the ESIMEA 30.

Figure 6:
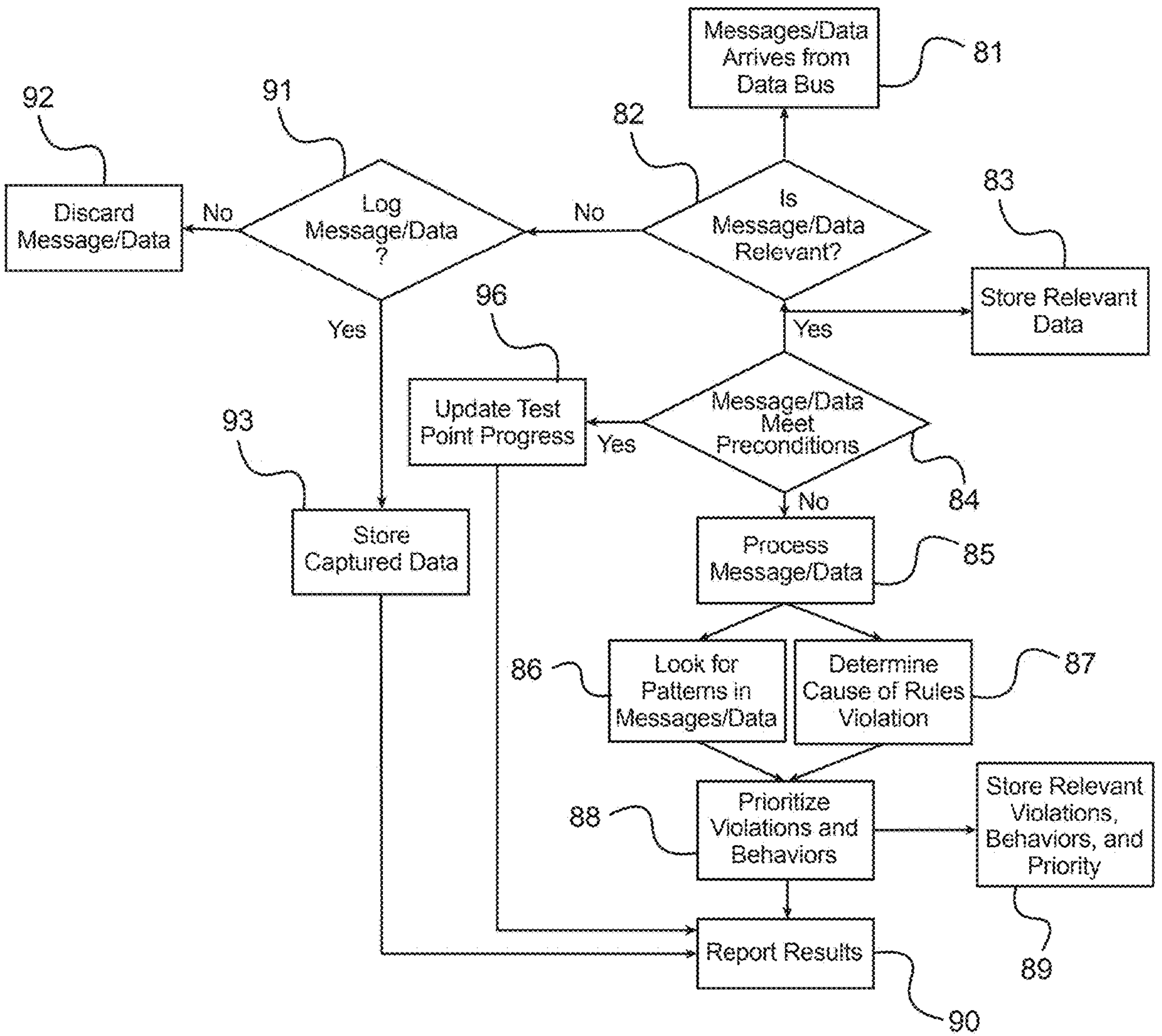
FIG. 6 is a flow chart of the running process of the present invention.

Referring to FIG. 6, messages and data will arrive from a data bus 81 and are then parsed to determine the relevancy of the data 82. If a datum is determined not to be relevant the message and/or data will be logged if needed 91 or otherwise discarded 92. If the data are relevant, storage of the captured data 93 is runtime selectable. If the datum is relevant a record of the data is saved for future analysis and then sent to the ESIMEA 30 checks to perform further checks on the data. After the different ESIMEA 30 checks have processed the data, a higher level analysis will continually monitor for larger system level patterns in the data. In parallel anomalies and violations will be investigated to aggregate error data. Once all the analysis has been completed a prioritization of results will occur for reporting and storage of the results.

Particularly the steps are: messages/data arrive from the data bus 81; the messages/data are determined to be relevant or not 82; if relevant the messages/data are stored 83 and the messages/data are determined to meet preconditions or not 84; if not the messages/data are processed 85; the system looks for patterns 86 and the system determines the causes of any rules violation 87; violations and behaviors are prioritized 88, violations and relevant behaviors are stored 89 and the results reported 90.

If the messages/data are determined not to be relevant, the messages/data may be logged 91 and ultimately discarded 92; with captured data being stored and the results being reported 90. If the messages/data do meet the preconditions 84, the test progress is updated 96 and the results reported 90.

Figure 7:
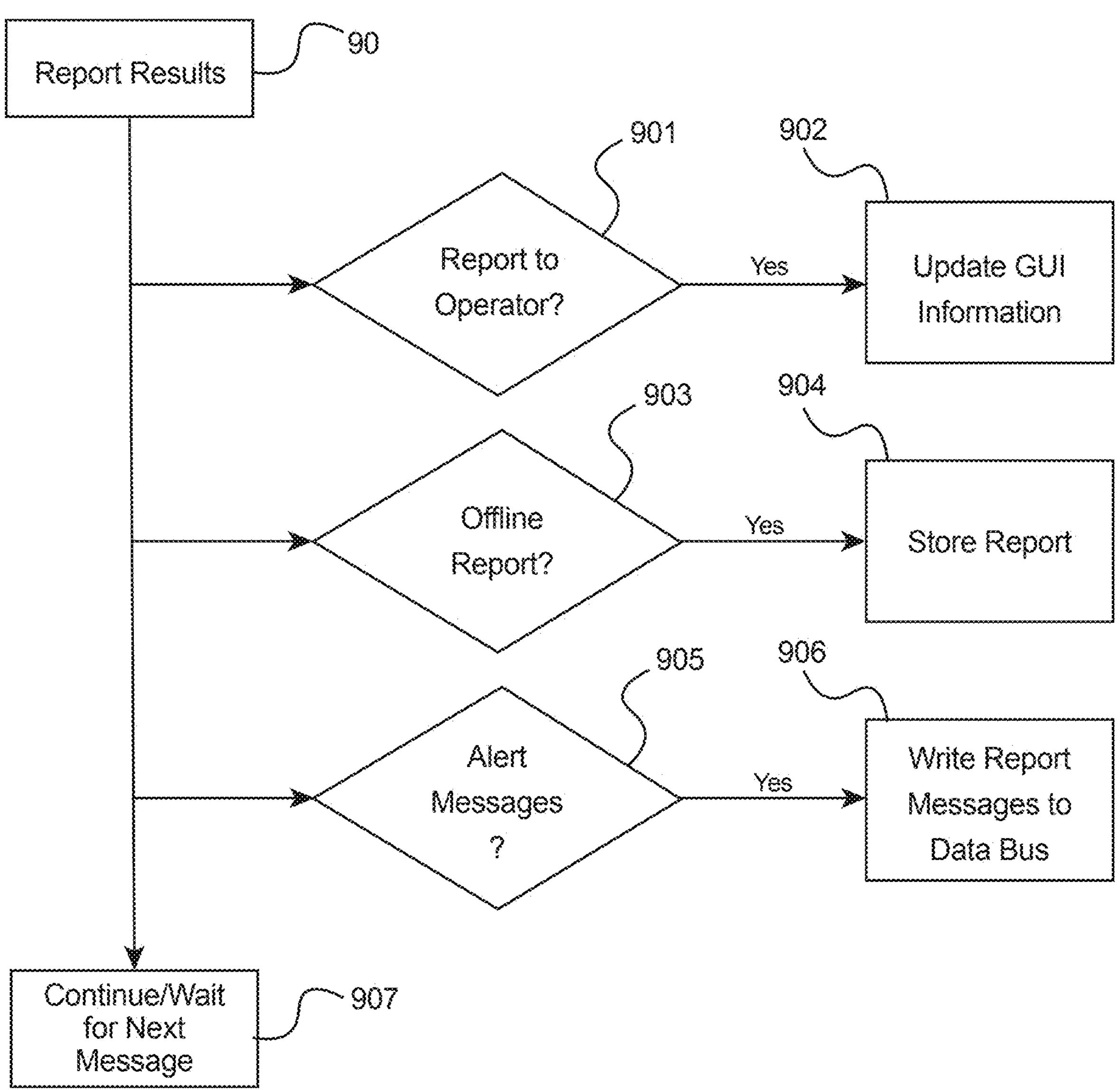
FIG. 7 is a flow chart of the reporting process according to the present invention.

Referring to FIG. 7, to determine where the test results and warnings which have been reported are disseminated, the type of data and severity of any threat are considered. Reporting to an operator 901 is configurable to differing information severity and updated to the graphical user interface 902. Reporting by storing offline 903 may be configurable to allow for modulation depending on the limitations of the system to sort the report 904. Alert messages may be disseminated 905 to be written back out to the data bus 906 in order to allow for an additional message path to alert the necessary components and either continue or wait for the next message 907.

Figure 8:
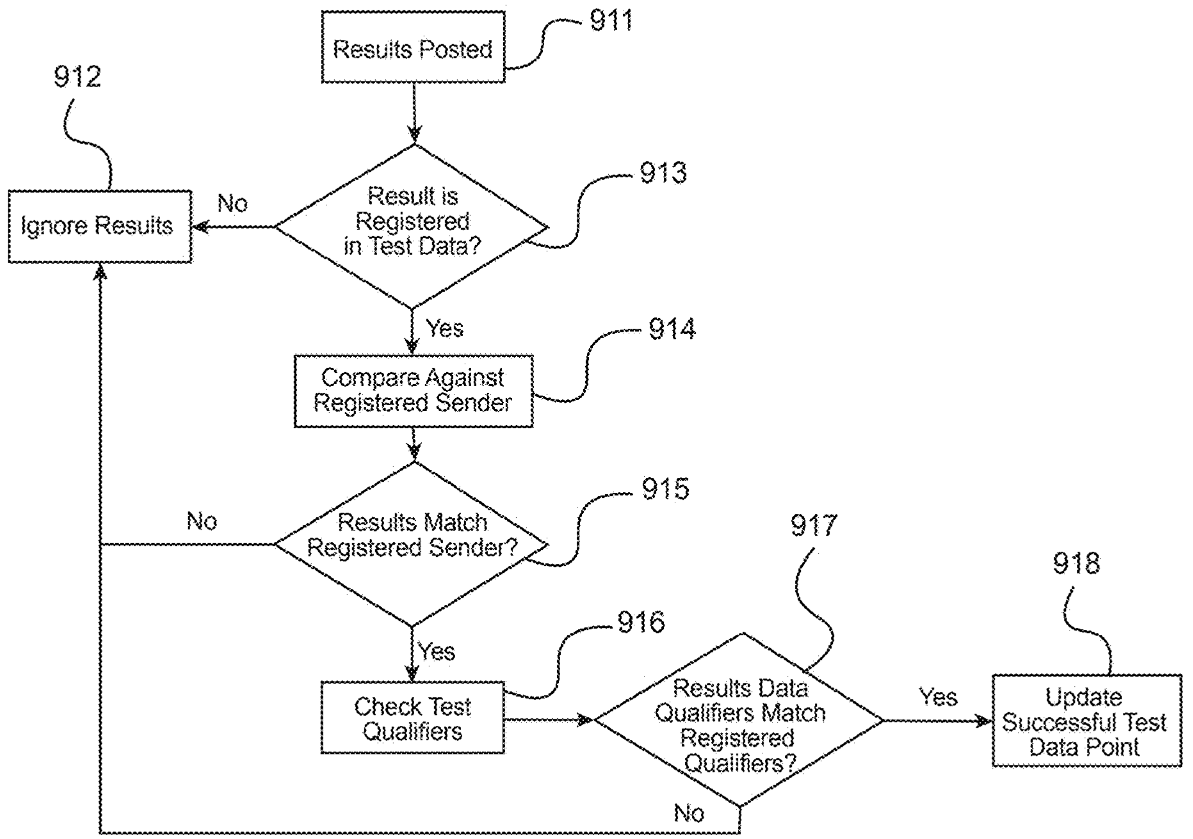
FIG. 8 is a flow chart of a test verification process according to the present invention.

Referring to FIG. 8, results are posted 911 to the Report database 72 and the result registered in the test data 913. Then the Test verification component 75 will check the entry against a list of registered Test Data. If the data match: a further check occurs to determine if the entry is from a registered sender 914; a check to determine if the data contain the specific qualifying data 915 inside of the result to match the registered sender; and if so the test qualifiers are checked 916, then the results qualifiers are matched to registered qualifiers 917 and if so the data are updated as a successful data point 918. The results may be sent to the graphical components 76 test data and/or stored for later use. If the results are not registered, the results do not match the registered sender or the data qualifiers do not match the registered qualifiers, the results are then ignored 912.

Figure 9:
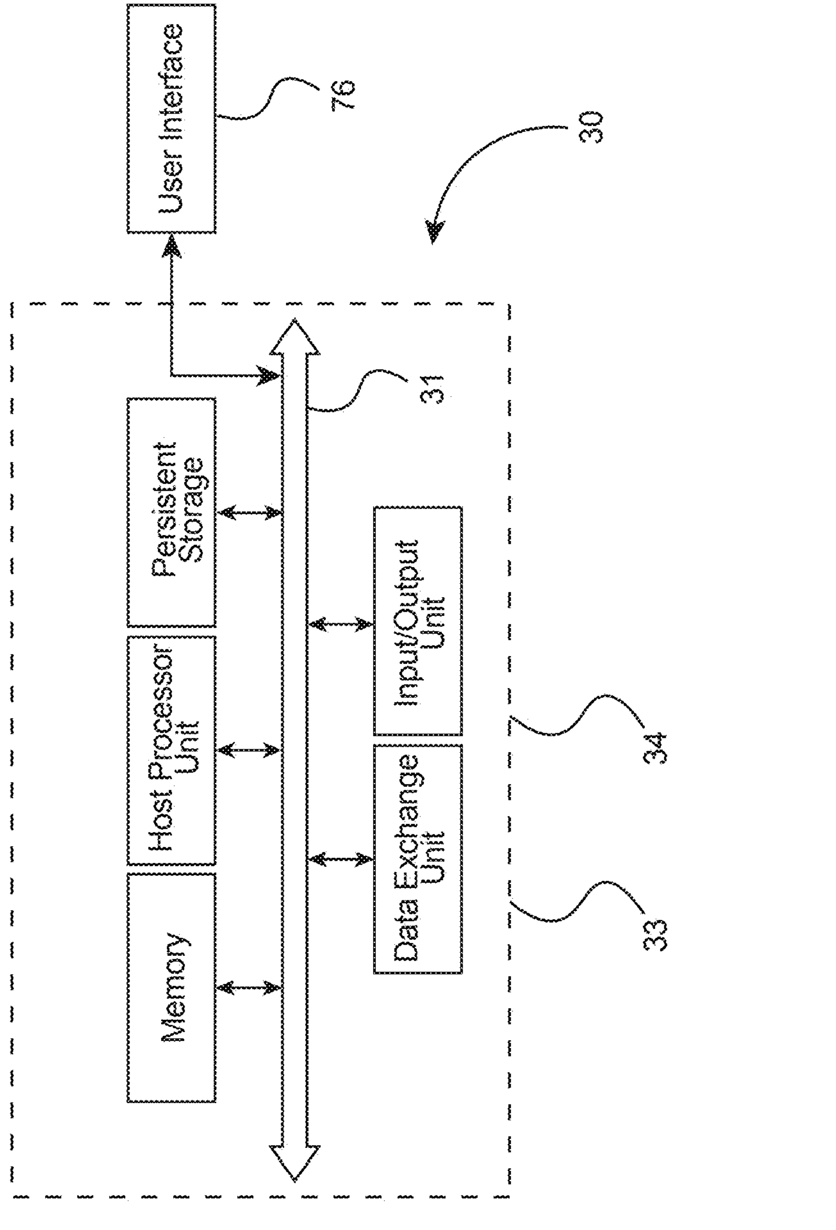
FIG. 9 is a block diagram of the sub-processing components usable with the present invention.

Referring to FIG. 9, the ESIMEA 30 may comprise a standard order management subsystem (OMS) 33. The ESIMEA 30 sub-processing components may comprise a computer processing card 34 containing any of a computer-executable program, routine, application, applet, service and/or object executable by a processor.

Figure 10:
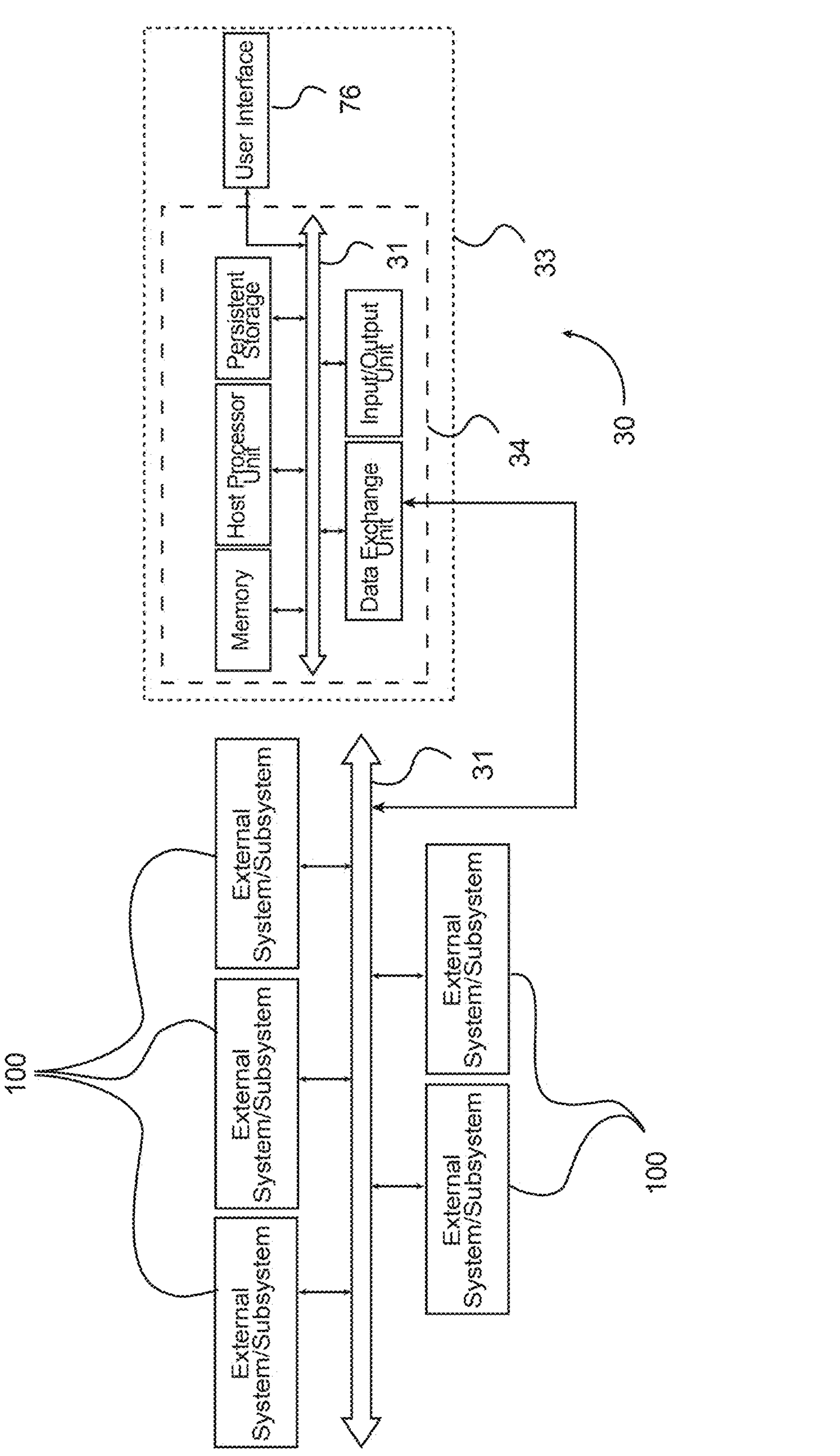
FIG. 10 is a block diagram of a monitoring bus for use with the system of the present invention.

Referring to FIG. 10, the ESIMEA 30 may be modular and split across plural computer processing cards 34 for load balance and to distribute the workload. The computer processing cards 34 may represent a hardware example of the embodiments and may use a computer daughter card to augment a main processing module or card in order to provide enhanced processing capability. The processing card 34 may include a plurality of programs, routines, applications, applets, services, objects executing on any suitable processor in almost any programming language. The daughter card may be configured as an expansion circuit card affixed to a motherboard or the processing cards which accesses memory. The processor, either directly or through a low latency message/data bus 31, transfers commands, signals, and/or data between the daughter card and the processing card to external systems and subsystems 100.

In various embodiments the ESIMEA 30 may be executed as a ground system with data relayed from a downlink of aircraft. Or the ESIMEA 30 may be deployed after the fact by replaying data. Or the ESIMEA 30 may be used to create normal message/data flows by monitoring live systems and may be used for test point validation.

The disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computer, netbook computer), microprocessor-based or programmable consumer or industrial electronics, and the like. The illustrated aspects may be practiced in distributed computing environments where tasks are performed by remote processing devices linked through a communications network. In a distributed computing environment, program modules can be located in both local and remote memory storage devices.

Exemplary non-transitory computer readable media are physical, transferable, reproducible, may comprise all computer readable media except for a transitory propagating signal and particularly include flash drives, magnetic strips, optical drives, CDs, DVDs, internal/external hard drives, more particularly internal/external solid state hard drives, and further exclude RAM, volatile memory requiring power for data storage, signals and effervescent carrier waves. In an alternative embodiment, transitory computer readable media may also be used.

Terms such as "store," "storage," "data store," data storage," "database," and substantially any other information storage component relevant to operation and functionality of a component, refer to "memory components," or entities embodied in a "memory" or components comprising the memory. By way of non-limiting illustration, and not limitation, volatile memory, non-volatile memory, disk storage, and memory storage. Further, non-transitory memory can be included in read only memory (ROM), programmable ROM (PROM), electrically programmable ROM (EPROM), electrically erasable ROM (EEPROM), or flash memory. Transitory memory can comprise random access memory (RAM), which acts as external cache memory. By way of non-limiting illustration, RAM is available as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a signal processor or a block of random access memory, hard disk, or the like) or multiple pieces of hardware. Similarly, the programs may be standalone programs, may be incorporated as subroutines in an operating system, may be functions in an installed software package, and the like. It should be understood that the various embodiments are not limited to the arrangements and instrumentality shown in the drawings. While the invention has been described and illustrated in the description and drawings, the same is to be considered as illustrative and not restrictive in character. The invention is limited only by the appended claims and all equivalents thereof.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." The term "or" as used herein is to be interpreted as an inclusive or meaning any one or any combination. Therefore, "A, B or C" means "any of the following: A; B; C; A and B; A and C; B and C; A, B and C." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern according to Phillips v. AWH Corp., 415 F.3d 1303 (Fed. Cir. 2005). All limits shown herein as defining a range may be used with any other limit defining a range of that same parameter. That is the upper limit of one range may be used with the lower limit of another range for the same parameter, and vice versa. As used herein, when two components are joined or connected the components may be interchangeably contiguously joined together or connected with an intervening element therebetween. A component joined to the distal end of another component may be juxtaposed with or joined at the distal end thereof. While particular embodiments of the present invention have been illustrated and described, it would be obvious to those skilled in the art that various other changes and modifications can be made without departing from the spirit and scope of the invention and that various embodiments described herein may be used in any combination or combinations. It is therefore intended the appended claims cover all such changes and modifications that are within the scope of this invention.

What is claimed is:

1. A method for monitoring the integrity of a computer architecture, using a system embeddable therein and comprising the steps of:

providing a registration component for receiving and compiling offline data into registration objects; and having a behavior, constraint and test data database for receiving the offline data from the registration component and measuring the offline data against predetermined benchmarks to yield test results; a reporter component for determining which test results, if any, should be escalated as a warning of anomalous behavior; an enforcement component for taking mitigative action with external components responsive to anomalous behavior reported in the test results and an external component in communication with the enforcement component and being configured to throttle or cease activity responsive to the warning from the enforcement component;

providing a plurality of benchmarks relevant to operation of the computer;

receiving offline data comprising multiple packets of data;

compiling the offline data into registration objects using a registration component;

measuring the offline data against the respective benchmarks to using a behavior, constraint and test data database to yield test results;

determining which test results should be escalated as a status indicating anomalous behavior; and taking mitigative action with one or more external components responsive to the respective anomalous behavior.

2. A method according to claim 1 further comprising the step of throttling activity responsive to the warning from the enforcement component upon communication from the external component.

3. A method for monitoring the integrity of a computer architecture, the method comprising the steps of:

providing a registration component for receiving and compiling offline data into registration objects;

providing a behavior, constraint and test data database for receiving the registration objects from the registration component and measuring the offline data against predetermined benchmarks to yield test results;

providing a prioritization component configured to receive plural inputs from the behavior, constraint and test data database in parallel and prioritize an order for processing the test results;

providing a reporter component for determining which test results, if any, should be escalated as a warning of anomalous behavior;

providing an enforcement component for taking mitigative action with external components responsive to anomalous behavior reported in the test results; and providing plural runtime data providers intermediate the behavior, constraint and test database and the prioritization component and being configured to provide the benchmarks, wherein the runtime data providers are selected from the group consisting of a message/data parser component, a message/data relevancy component, a message/database and a check component notification; and taking mitigative action with one or more components responsive to the warning of anomalous behavior.

4. A method according to claim 3 wherein the behavior, constraint and test data database compares the offline data against check components selected from the group consisting of a behavior check component, a performance check component, a sequence check component, a field value check component, a field value boundary check component, a time check component, a relationship check component and an extension check component.

5. A method according to claim 4 wherein the plural runtime data providers are in parallel communication with plural offline data check components, the offline data check components being in parallel communication with the prioritization component.

6. A method according to claim 3 wherein the plural runtime data providers include all of a message/data parser component, a message/data relevancy component, a message/database and a check component notification.

7. A method of monitoring the integrity of a computer architecture using a system embedded therein, the method comprising the steps of: providing a plurality of benchmarks relevant to operation of a computer; receiving offline data comprising multiple packets of data; compiling the offline data into registration objects using a registration component; measuring the offline data against the a plurality of respective benchmarks to using a behavior, constraint and test data database to yield test results; determining which test results should be escalated as a status indicating anomalous behavior; and taking mitigative action with one or more external components selected from a group consisting of network switches, policy management engines and security scanners, the one or more external components being responsive to the respective anomalous behavior, wherein the step of taking mitigative action comprises a step of discontinuing network traffic to a network switch and reporting the status to a graphical component for interpretation by a user.

* * * * *